(12) United States Patent
Moore et al.

(10) Patent No.: US 7,749,923 B2
(45) Date of Patent: Jul. 6, 2010

(54) FACING AND FACED INSULATION PRODUCTS

(75) Inventors: Anthony Edward Moore, Glen Allen, VA (US); Melvin Glenn Mitchell, Penrose, NC (US); Monroe William Shumate, Littleton, CO (US); Edward Albert Bright, Littleton, CO (US); James W. Stacy, Peyton, CO (US)

(73) Assignee: Johns Manville, Denver, CO (US)

( * ) Notice: Subject to any disclaimer, the term of this patent is extended or adjusted under 35 U.S.C. 154(b) by 0 days.

(21) Appl. No.: 11/517,059

(22) Filed: Sep. 7, 2006

(65) Prior Publication Data

US 2008/0081138 A1   Apr. 3, 2008

(51) Int. Cl.
*B32B 17/02* (2006.01)
*B32B 17/06* (2006.01)

(52) U.S. Cl. ............... 442/23; 442/27; 442/33; 442/34; 442/52; 442/53; 442/85; 442/149; 442/412; 138/123; 138/149

(58) Field of Classification Search ............ 442/23, 442/27, 33, 34, 52, 53, 85, 149, 412; 138/123, 138/149
See application file for complete search history.

(56) References Cited

U.S. PATENT DOCUMENTS

| | | | | |
|---|---|---|---|---|
| 3,442,750 A | * | 5/1969 | Wilcox | 428/109 |
| 4,780,347 A | * | 10/1988 | Cohen | 428/34.2 |
| 5,516,580 A | * | 5/1996 | Frenette et al. | 442/153 |
| 5,776,841 A | * | 7/1998 | Bondoc et al. | 442/320 |
| 2004/0137181 A1 | * | 7/2004 | Ruid et al. | 428/36.91 |

* cited by examiner

*Primary Examiner*—Norca L Torres-Velazquez
(74) *Attorney, Agent, or Firm*—Robert D. Touslee

(57) ABSTRACT

A facing laminate for insulation products includes: a foil or metallized polymeric film sheet layer forming an inner layer of the laminate that is adapted be bonded directly to a surface of an insulation product; a paper composite sheet layer, which may include synthetic and/or inorganic fibers, forming an outer exposed layer of the laminate; and a scrim intermediate and bonded to the foil or metallized polymeric film sheet and paper composite sheet layers. The facing laminate may include a humectant and/or a water, oil, and/or grease repellant component. The paper composite sheet layer of the laminate exhibits greater dimensional stability and reduced wrinkling when the laminate is exposed to conditions of high humidity. Insulation products to be faced with this facing laminate include pipe insulation, duct board, duct wrap insulation, metal building insulation, and other building insulation products.

5 Claims, 1 Drawing Sheet

FACING AND FACED INSULATION PRODUCTS

BACKGROUND OF THE INVENTION

The subject invention relates to a FSK facing sheet material laminate for insulation products and to insulation products faced with the FSK facing sheet material laminate. When the term "FSK facing sheet material laminate" is used herein, the term refers to a facing sheet material laminate that includes a foil or metallized polymeric film layer, a scrim, a paper or paper composite sheet layer, and an adhesive.

More specifically, the FSK facing sheet material laminate of the subject invention relates to a FSK facing sheet material laminate that offers opportunities for increased productivity and manufacturing cost reductions and that: exhibits enhanced dimensional stability and reduced deformation and wrinkling ("dimpling"); mold and mildew growth resistance; stain resistance; improved tape adhesion, improved ease of cleaning, enhanced flame spread resistance; good handleability; UV resistance; surface abrasion resistance; and overall good surface aesthetics prior to and during service. The FSK facing sheet material laminates of the subject invention may include one or more humectant(s); one or more water, oil, and/or grease repellant components; and/or a paper composite sheet of the paper composite sheet layer that includes synthetic and/or inorganic fibers so that when the facing sheet material is exposed to conditions of high heat and humidity (e.g. temperatures equal to or greater than 75° F. and relative humidities equal to or greater than 50%), the paper composite sheet layer of the FSK facing sheet material laminate exhibits enhanced dimensional stability and reduced deformation and wrinkling ("dimpling"). Preferably, the FSK facing sheet material laminate of the subject invention includes one or more flame retardants, fungi growth inhibiting agents, and/or other additives to enhance the performance of the laminate and the adhesive of the FSK facing sheet material laminate includes synthetic fibers and/or inorganic fibers to further enhance the dimensional stability and stiffness of the paper composite sheet layer and further reduce deformation and wrinkling ("dimpling") of the paper composite sheet layer when the FSK facing sheet material laminate of the subject invention is exposed to conditions of high heat and humidity. It is also contemplated that the paper composite sheet of the paper composite sheet layer may contain only synthetic and/or inorganic fibers and no cellulose fibers for dimensional stability and stiffness and reduced deformation and wrinkling ("dimpling") of the paper composite sheet layer when the FSK facing sheet material laminate of the subject invention is exposed to conditions of high heat and humidity. The faced insulation products of the subject invention that are faced with the FSK facing sheet material laminate of the subject invention include pipe insulation, duct board, duct wrap insulation, metal building insulation, and other building insulation products.

Current commercially available FSK facing sheet material laminates have an aluminum foil or metallized polyester film sheet forming an inner layer of the laminate, a kraft paper sheet forming an outer exposed layer of the laminate, a scrim intermediate the foil or metallized polyester film sheet layer and the paper sheet layer, and an adhesive that bonds the foil or metallized polyester film sheet layer, the scrim layer, and the paper sheet layer together. In use, the aluminum foil or metallized polyester film sheet forming the inner layer of these FSK facing sheet material laminates is bonded directly to a surface of an insulation product and the kraft paper sheet forming the outer layer of these FSK facing sheet material laminates becomes the visible surface of the faced insulation product. When these FSK facing sheet material laminates are exposed to conditions of high heat and humidity, the foil or metallized polyester film layer of these FSK facing sheet material laminates remains dimensionally stable while the kraft paper sheet layer of these FSK facing sheet material laminates absorbs moisture and expands. Furthermore, the aluminum foil or metallized polyester film layer of these FSK facing sheet material laminates is typically stiffer or more rigid than the kraft paper sheet layer of the laminates. Since the dimensionally stable, more rigid, foil or metallized polyester film layer and the kraft paper sheet layer of these FSK facing sheet material laminates are bonded together, the expansion of the kraft paper sheet layer relative to the dimensionally stable foil or metallized polyester film layer under conditions of high heat and humidity causes the kraft paper sheet layer to deform and wrinkle. This deformation and wrinkling of the kraft paper sheet layer adversely affects the visible surface of a faced insulation product by changing the visible surface from a smooth visibly pleasing surface to a surface having a visually unappealing mottled finish that can resemble the dimples on a golf ball. This visually unappealing mottled finish is commonly called "dimpling" in the industry.

Since the faced surfaces of many FSK faced insulation products remain exposed and many FSK faced insulation products, especially pipe insulation products, are frequently exposed to numerous cycles of high heat and humidity, there has been a need to provide a FSK facing sheet material laminate with an exposed paper or paper composite sheet layer that is more dimensionally stable and, preferably, stiffer or more rigid than the kraft paper sheet layers of current FSK facing sheet material laminates. In addition, for many applications, there has been a need to provide a FSK facing sheet material laminate that is more flame spread resistant and exhibits other desirable characteristics.

SUMMARY OF THE INVENTION

The FSK facing sheet material laminate of the subject invention provides a solution to the problems discussed above in connection with current FSK facing sheet material laminates. When exposed to conditions of high heat and humidity (e.g. temperatures equal to or greater than 75° F. and relative humidities equal to or greater than 50%), a kraft paper sheet of a humectant treated FSK facing sheet material laminate of one embodiment of the subject invention, compared to a non-humectant treated FSK facing sheet material laminate having a 100% cellulose fiber kraft paper sheet, absorbs less moisture and thereby exhibits less expansion or greater dimensional stability. When exposed to conditions of high heat and humidity, a non-humectant treated cellulose and glass fiber sheet (from 70% to 90% by weight cellulose fibers and from 10% to 30% by weight glass fibers) of a FSK facing sheet material laminate of another embodiment of the subject invention, compared to a non-humectant treated FSK facing sheet material laminate having a 100% cellulose fiber kraft paper sheet, also exhibits less expansion or greater dimensional stability. The greater dimensional stability exhibited by the paper composite sheet layers of the FSK facing sheet material laminates of the subject invention under conditions of high heat and humidity reduces the internal stresses otherwise present in previous paper sheet layers of FSK facing sheet material laminates under these conditions and the deformation and wrinkling ("dimpling") of the paper sheet layer caused by such internal stresses. Thus, compared to a non-humectant treated FSK facing sheet material laminates having a 100% cellulose fiber kraft paper sheet, the FSK facing sheet material laminates of the subject invention better retain their initial, as installed, smooth unwrinkled ("undimpled") appearance even after being subjected to numerous cycles of high heat and humidity.

The FSK facing sheet material laminates of the subject invention each include: a foil or metallized polymeric film sheet forming an inner layer of the laminate that is adapted be bonded directly to a surface of an insulation product; a paper composite sheet layer forming an outer visible layer of the laminate; a scrim intermediate the foil or metallized polymeric film sheet and the paper composite sheet layer; and an adhesive bonding the foil or metallized polymeric film sheet, the paper composite sheet layer, and the scrim together. The FSK facing sheet material laminates of the subject invention may include one or more humectant(s); one or more water, oil, and/or grease repellant components; and/or a paper composite sheet of the paper composite sheet layer that includes or is formed from synthetic and/or inorganic fibers. Humectant(s) belong to a family of hydrolyzed fatty acids with singular or multiple hydroxyl groups that prevent or inhibit the absorption of moisture by the fibers of the laminate's paper composite sheet to prevent or inhibit expansion of the fibers and the paper composite sheet caused by the absorption of moisture by the fibers of the sheet. The humectants utilized with certain of the FSK facing sheet material laminates of the subject invention may include but are not limited to: glycerin, ethylene glycol, polyethylene glycol (PEG200 and PEG400), and isopropylene glycol. The humectant or humectants may be present in the paper composite sheet layer as coatings and/or saturates and/or in the adhesive of the FSK facing sheet material laminate. The water, oil, and/or grease repellant component(s) may be present in the paper composite sheet layer of the laminates as coating(s) and/or saturate(s) to impart additional strength, stiffness, and/or water, oil, and grease resistance to the paper composite sheets.

Preferably, the paper composite sheet layers and/or adhesives of the FSK facing sheet material laminates of the subject invention include one or more flame retardants and fungi growth inhibiting agents that make the FSK facing sheet material laminates of the subject invention more resistant to flame spread and mold or mildew growth. Preferably, the paper composite sheets of the humectant treated FSK facing sheet material laminates of the subject invention contain synthetic and/or inorganic fibers in addition to cellulose fibers. The synthetic and/or inorganic fibers of the paper composite sheets function to further enhance dimensional stability of the paper composite sheets, to stiffen the paper composite sheets, and to reduce wrinkling of the paper composite sheets when the FSK facing sheet material laminates are exposed to conditions of high heat and humidity and as discussed above, certain FSK facing sheet material laminates of the subject invention that have paper composite sheets containing synthetic and/or inorganic fibers do not contain a humectant. It is also contemplated that the paper composite sheet may contain only synthetic and/or inorganic fibers and no cellulose fibers.

Faced insulation products that are faced with the FSK facing sheet material laminate of the subject invention include: pipe insulation, duct board, duct wrap insulation, metal building insulation, and other building insulation products. Due to the frequent exposure of faced pipe insulation to conditions and cycles of high heat and humidity, the FSK facing sheet material laminate of the subject invention is particularly well suited for jacketing jacket pipe insulation products.

DESCRIPTION OF THE PREFERRED EMBODIMENTS

Figure 1:
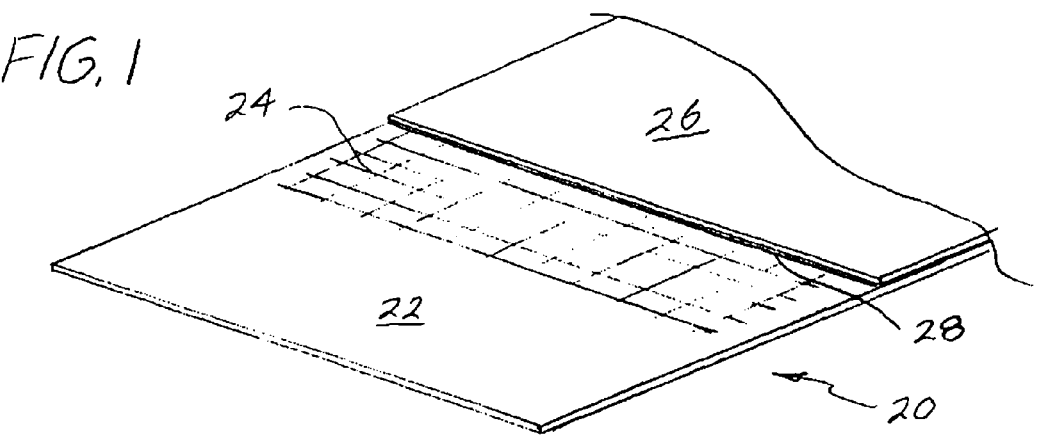
FIG. 1 is a schematic perspective view of the FSK facing sheet material laminate of the subject invention with portions of the laminate broken away to better show the different layers of the laminate.

As shown in FIG. 1, the FSK facing sheet material laminate 20 of the subject invention includes a paper composite sheet layer 22, a scrim 24, a foil or metallized polymeric film sheet layer 26, and an adhesive 28 that bonds the paper composite sheet layer 22, the scrim 24, and the foil or metallized polymeric sheet layer 26 together. When the facing sheet material 20 is applied to the surface of an insulation product as a facing, e.g. as the jacket of a tubular pipe insulation assembly, the paper composite sheet layer 22 forms the outer visible surface of the facing, the foil or metallized polymeric film sheet layer 26 is adhered to the surface of the insulation, and the scrim 24 functions to reinforce the laminate. The FSK facing sheet material laminate 20 is typically manufactured in a continuous laminating process; typically, has a width of about seventy-two inches; and is typically packaged in rolls that are at least 1000 feet in length.

The paper composite sheet layer 22 is typically made of a bleached kraft paper sheet that, preferably, is between about 30 and 55 pounds/3000 square feet and that may include synthetic and/or inorganic fibers and various additives; the scrim 24 is made of fiberglass reinforcing yarn such as but not limited to a G75 or H110 yarn; and the foil or metallized polymeric film layer 26 is an aluminum foil between about 0.00025 inches and about 0.001 inches in thickness (between about 0.25 mils and about 1 mil in thickness) or a metallized polyester film between about 0.48 mils and about 100 mils in thickness (between about 48 and 100 gauge in thickness).

While the paper composite sheet forming the paper composite sheet layer 22 of the laminate may be a kraft paper sheet (e.g. bleached kraft paper based sheet) containing only cellulose fibers, the paper composite sheet forming the paper composite sheet layer 22: a) may be a cellulose fiber paper sheet (e.g. bleached kraft paper based sheet) that includes synthetic and/or inorganic fibers to provide the paper composite sheet layer 22 with greater dimensional stability and stiffness and to reduce the deformation and wrinkling of the paper composite sheet layer when the laminate is exposed to conditions of high heat and humidity; or b) a paper composite sheet containing only synthetic and/or inorganic fibers and no cellulose fibers. Where the paper composite sheet layer 22 is a cellulose paper based sheet that includes synthetic and/or inorganic fibers, the paper composite sheet layer 22 typically includes by dry weight:

| Component | Broad Range | More Preferred Range |
| --- | --- | --- |
| Synthetic and/or Inorganic Fibers | 2% to 60% | 5% to 40% |
| Humectant(s) | 0.1% to 10% | 0.1% to 5% |
| Coating and/or Saturates (Other Than Humectants) To Impart Strength, Stiffness, and/or Water, Oil, and Grease Resistance | 0% to 25% | 0.5% to 15% |
| Binder | 0% to 15% | 0% to 10% |
| Fillers | 0% to 30% | 0% to 15% |
| Flame Retardant(s) | 0% to 25% | 0.5% to 25% |
| Cellulose Fibers | Remainder | Remainder |

Preferably, the synthetic fibers used in the paper sheet layer 22 are between about 1 and about 50 Denier (more preferably between about 1 and about 5 Denier) and have a mean length between 0.25 and 1.50 inches. Examples of synthetic fibers that may be used in the paper sheet layer 22 are polyethylene fibers, polypropylene fibers, polyester fibers, polyamide fibers, acrylic fibers, nylon fibers, rayon fibers, carbon-pitch or pyrolized fibers, and/or blends thereof. Preferably, the inorganic fibers used in the paper sheet layer 22 are between about 0.6 and about 25 microns in diameter (more preferably between about 0.6 and about 4 microns in diameter) and have a mean length between 0.25 and 6 inches. Examples of inorganic fibers that may be used in the paper sheet layer 22 are glass fibers, bio-soluble glass fibers, glass micro-fibers, bio-soluble glass micro-fibers, glass blowing wool fibers, chop strand glass fibers, mineral wool fibers, basalt fibers, soluble amorphous wool fibers, refractory ceramic fibers (with and without shot), crystalline ceramic fibers, and/or blends thereof. However, other synthetic and inorganic fibers may also be used in the paper sheet provided such fibers or blends of such fibers with the synthetic and inorganic fibers listed immediately above provide the paper sheet with greater dimensional stability and stiffness and reduce the deformation and wrinkling of the paper sheet when the laminate is exposed to conditions of high heat and humidity. When used in a cellulose fiber paper based sheet (e.g. bleached kraft paper based sheet) forming the paper sheet layer 22, the synthetic and/or inorganic fibers of the paper sheet layer 22 are imperceptible or substantially imperceptible and do not adversely affect the appearance of the paper sheet layer 22.

As discussed above, moisture absorption by the cellulose fibers the kraft paper sheet layers of prior art FSK facing sheet material laminates has caused the paper sheet layers of prior art FSK facing sheet material laminates to become dimensionally unstable, expand, deform, and wrinkle when exposed to conditions of high heat and humidity. Certain embodiments of the FSK facing sheet material laminate 20 of the subject invention are treated with one or more humectants to prevent or inhibit the absorption of moisture by the fibers of the paper composite sheets of the paper composite sheet layers 22 of the laminates. The one or more humectants utilized with the FSK facing sheet material laminates 20 may include but are not limited to: glycerin, ethylene glycol, polyethylene glycol (PEG200 and PEG400), and isopropylene glycol.

The humectant(s) may be introduced into the paper composite sheet of the paper composite sheet layer 22 during the paper making process and when incorporated into the paper composite sheet during the paper making process, comprise between 0.1% and 10% by dry weight of the paper composite sheet and most preferably comprise between about 0.5% and about 1% by dry weight of the paper composite sheet.

The humectant(s) may be applied to one or both major surfaces of the paper composite sheet of the paper composite sheet layer 22, prior to laminating the paper composite sheet to the other components of the FSK facing sheet material laminate 20, using spray misting or other conventional coating techniques and preferably comprise between about 0.1 and about 10% by dry weight of the paper composite sheet.

The humectant(s) may be applied to the visible surface of the paper composite sheet of the paper composite sheet layer 22 as a post treatment of the formed FSK facing sheet material laminate 20 by spray misting or other conventional coating techniques and preferably comprise between about 0.1 and about 10% by dry weight of the treated or coated paper composite sheet.

The humectant(s) may be applied to the visible surface of the paper composite sheet of the paper composite sheet layer 22, as an ingredient of a surface coating in a post treatment of the formed FSK facing sheet material laminate 20 by spray misting or other conventional coating techniques and preferably the humectant(s) comprise between about 0.1 and about 10% by dry weight of the coated paper composite sheet. The other ingredients of the coating would impart strength, stiffness, and/or water, oil, and grease resistance to the coated paper composite sheet and the other ingredients of the coating would include but not be limited to: ethylates or pearl starch PVOH, boric acid cross-linked PVOH, latex emulsions, acrylic emulsions, PVC emulsions, hydrophilic modified PET, PE, or PP; and oil and grease resistant chemistries such as fluorochemicals, tri-valent chromium, silicone, and waxes. The other ingredients of the coating would comprise between about 0.5% and about 10% by dry weight of the coated paper composite sheet whereby the coating of humectant(s) and other ingredients would comprise between about 0.6% and about 20% by weight of the coated paper composite sheet.

A surface coating, other than a humectant, can be applied to the exposed surface of the paper composite sheet of the paper composite sheet layer 22 to impart strength, stiffness and/or water, oil, and grease resistance to the paper. Such coatings would comprise between about 0.5% and about 10% by dry weight of the coated paper composite sheet and include but are not limited to: ethylates or pearl starch PVOH, boric acid cross-linked PVOH, latex emulsions, acrylic emulsions, PVC emulsions, hydrophilic modified PET, PE, or PP; and oil and grease resistant chemistries such as fluorochemicals, tri-valent chromium, silicone, and waxes.

A saturate can be included in the paper composite sheet of the paper composite sheet layer 22 to impart strength, stiffness and/or water, oil, and grease resistance to the paper. Such saturates would comprise between about 0.5% and about 25% by dry weight of the paper composite sheet and include but not limited to: ethylates or pearl starch PVOH, boric acid cross-linked PVOH, latex emulsions, acrylic emulsions, silicone oil-emulsions, silicone-reactive, siliane-reactive, PVC emulsions, hydrophilic modified PET, PE, or PP; and oil and grease resistant chemistries such as fluorochemicals including fluoro-silicone, tri-valent chromium, silicone, and waxes. In amounts between about 0.5% and about 10% by dry weight of the paper composite sheet these saturates would also function as binders. It is contemplated that the surface coatings of the immediately preceding paragraph and the saturate(s) of this paragraph can both be included in the FSK facing sheet material laminate 20 and that the surface coatings and/or saturates would improve the dimensional stability, moisture resistance, UV stability, and flame spread resistance of the laminate as well as facilitate an easier cleaning of the laminate 20.

The paper composite sheet of the paper composite layer 22 can include a binder or binders such as but not limited to starch. Fillers also may be included in the paper composite sheet of paper composite sheet layer 22, such as but not limited to: clay (ball, kaolin, pyrophylite, wolastinite), titania, calcia, magnesia, dolomite, zinc oxide, amorphous silica, amorphous alumina, fumed or precipitated silica, borax, recycled glass, mica, vermiculite, perlite, and mixtures of any two or more of the these fillers. The fillers could function to reduce costs, to block radiation, and/or to provide UV protection, insect resistance, color, and fire, smoke, and flame resistance.

The paper composite sheet of the paper composite sheet layer 22 may also include a flame retardant such as but not limited to aluminum tri-hydrate or ATH, which would improve the flame spread resistance of the FSK facing sheet material laminate 20 and also function in the paper composite sheet as a humectant.

As stated above, the scrim 24 is located intermediate and bonded to the paper composite sheet layer 22 and the foil or metallized polymeric film sheet layer 26. The scrim is made of a reinforcing yarn, such as but not limited to G75 of H110 glass fiber yarn, and preferably is from 2 to 6 strands per inch in both the machine and cross machine direction with a typical scrim being 5 strands per inch in both the machine and cross machine direction.

The adhesive 28, which bonds the paper composite sheet layer 22, the scrim 24, and the foil or metallized film sheet layer 26 together, can provide greater dimensional stability, greater moisture resistance, added stiffness, and/or improved handleablity. Examples of adhesives that can be used as the adhesive 28 include but are not limited to materials, melamine, urea formaldehyde, phenolic, polyurethane, acrylic, latex, and acrylo-nitrile. Additional adhesives that can be used as the adhesive 28, include adhesives that can migrate into the paper composite sheet layer 22 to improve the physical characteristics of the FSK facing sheet material laminate 20 by improving UV stability, flame spread resistance, opacification, and/or color of the paper composite sheet layer 22. Examples of such migrating adhesives are colloidal silica or alumina, sodium or potassium silicate, ammonium phosphate stabilized with zinc oxide, magnesia or alumina; borax, and oxi-chloride stabilized with zinc oxide or magnesia. Of the above adhesives, a latex-laminating adhesive is the preferred adhesive. While the adhesive layer 28 does not need to contain fibers, preferably, the adhesive of the adhesive layer 28 includes between about 1% and about 5% by weight synthetic and/or inorganic fibers such as but not limited to the synthetic and inorganic fibers and/or blends thereof set forth above for inclusion into the paper composite sheet of the paper composite sheet layer 22 of the laminate. Preferably, the adhesive also includes between about 0.5% and about 30% by weight flame retardant (e.g. aluminum tri-hydrate or ATH), between about 10 ppm and about 100 ppm (0.01 to about 0.10% by dry weight) thiabendazole such as Metasol TK-100 or about 200 ppm and about 2000 ppm (preferably between 400 ppm and 600 ppm) 2-(4-Thiazolyl) Benzimidazole ("TBZ") as a mold and mildew growth retardant, and about 9% by dry weight magnesium hydrate to scavenge chlorine and protect the aluminum foil or metallized polyester film sheet from chlorine degradation. The adhesive 28 may also include one or more humectants in amounts between about 0.1% and about 10% by dry weight.

A preferred embodiment of the FSK facing sheet material laminate 20 of the subject invention has or includes: a paper composite sheet layer 22, for providing greater dimensional stability and stiffness and reduced deformation and wrinkling of the paper composite sheet when the FSK facing sheet material laminate 20 is exposed to conditions of high heat and humidity, that includes: from about 70% to about 90% by weight cellulose fibers, from about 10% to about 30% by weight glass fibers having a mean diameter between about 0.6 microns and about 4 microns (e.g. glass fibers having a mean diameter of about 0.65 microns, about 2.7 microns, or about 4.0 microns); a glass fiber scrim 24, an aluminum foil layer 26; and a latex adhesive 28. Another preferred embodiment of the FSK facing sheet material laminate 20 of the subject invention has or includes: a paper composite sheet layer 22, for providing greater dimensional stability and stiffness and reduced deformation and wrinkling of the paper composite sheet when the FSK facing sheet material laminate 20 is exposed to conditions of high heat and humidity, that includes: from about 70% to about 90% by weight cellulose fibers, from about 10% to about 30% by weight glass fibers having a mean diameter between about 0.6 microns and about 4 microns (e.g. glass fibers having a mean diameter of about 0.65 microns, about 2.7 microns, or about 4.0 microns) and 0.1% to about 10% by dry weight humectant provided by a humectant containing coating applied at between 1 and 4 pounds per 1000 square feet; a glass fiber scrim 24, an aluminum foil layer 26; and a latex adhesive 28. Another preferred FSK facing sheet material laminate 20 of the subject invention has a paper composite sheet layer 22, for providing greater dimensional stability and stiffness and reduced deformation and wrinkling of the paper composite sheet when the FSK facing sheet material laminate 20 is exposed to conditions of high heat and humidity, that includes: from about 70% to about 90% by weight cellulose fibers and from about 10% to about 30% by weight glass fibers having a mean diameter between about 0.6 microns and about 4 microns (e.g. glass fibers having a mean diameter of about 0.65 microns, about 2.7 microns, or about 4.0 microns); a glass fiber scrim 24; an aluminum foil layer 26; and a humectant containing latex adhesive 28. The latex adhesive 28 of this FSK facing sheet material laminate 20 contains from about 0.1% to about 10% by dry weight humectant and is present in amounts between 1 and 4 pounds per 1000 square feet.

A more specific example of a preferred embodiment of the FSK facing sheet material laminate 20 includes: a) 45 lb/3000 ft$^2$ alkaline paper (AKD) layer 22 with cationic wet end starch, $CaCO_3/TiO_2$ filled, ethylated starch, and a fluorinated compound such as Aquapel® (marketed by PPG industries) at size press, which would contain between about 70% and about 90% by weight cellulose fibers and between about 10% and about 30% by weight glass fibers having a mean diameter between about 0.6 microns and about 4 microns (e.g. microstrand glass fibers having a mean diameter of about 0.65 microns, about 2.7 microns, or about 4.0 microns); b) 13 lb/3000 ft$^2$ vinylidene chloride/butadiene copolymer latex adhesive 28 wherein the latex adhesive contains 7 lb/3000 ft$^2$ adhesive additives in the following approximate percentages by weight 29% antimony, 26% decabromo diphenyl ether (decabrom), 9% magnesium hydrate, and 36% aluminum trihydrate; c) glass fiber scrim 24; and an aluminum foil layer 26. The use of a water repellant compound, such as Aquapel® (marketed by PPG industries), which is typically applied as a coating on the outer facing surface of the paper composite sheet during the paper making process, provides the paper composite sheet with more uniform absorption characteristics and enhances the application of surface coatings such as the humectant containing surface coatings and non-humectant containing surface coatings discussed above that can be applied to the exposed surface of the paper composite sheet of the paper composite sheet layer 22 to impart strength, stiffness and/or water, oil, and grease resistance to the paper.

In addition to providing greater dimensional stability and stiffness and reduced deformation and wrinkling, the use of a paper composite sheet layer 22 containing glass fibers in the preferred embodiments of the two preceding paragraphs should enhance the flame spread resistance of the FSK facing sheet material laminate 20. While glass fibers melt, they do not burn like cellulose fibers. Thus, these embodiments of FSK facing sheet material laminate 20 should be able to pass the relevant ASTM flame spread tests with reduced amounts of flame retardant additives and offer the potential of a lower cost, more environmentally friendly flame retardant FSK facing sheet material laminate.

Figure 2:
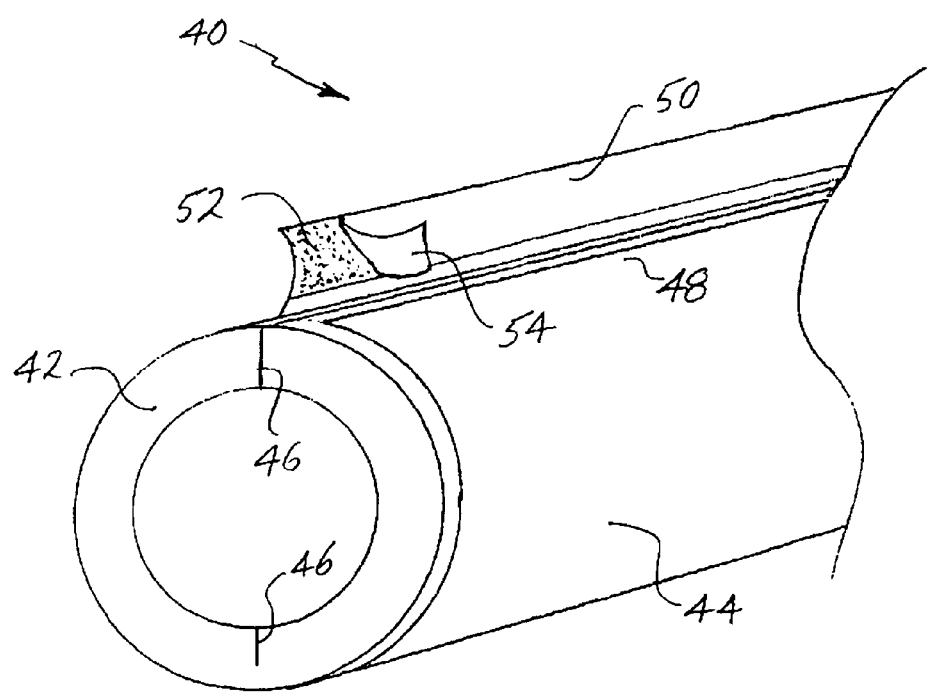
FIG. 2 is a partial schematic perspective view of a jacketed tubular pipe insulation assembly wherein the jacket is made from a FSK facing sheet material laminate of the subject invention.

Laboratory hand sheet samples were made using various concentrations of glass and/or other synthetic fibers in conjunction with the standard paper fiber pulp of a bleached kraft paper normally used for a paper sheet layer of a standard foil/scrim kraft facing sheet material. These hand sheet samples were compared to control hand sheet samples made of the standard paper fiber pulp for lamination curl and paper stress. When exposed to conditions of high heat and humidity (e.g. temperatures of 75° F. or greater and relative humidities of 50% or greater), all of the paper sheet layer formulations that included synthetic fibers exhibited improved dimensional stability and reduced wrinkling when compared to the control hand sheet samples. The following tested formulations are by weight:

1. Control (100% Fraser Paper Stock with no additives)
2. 90% Fraser Paper Stock/10% SWP Fybrel® PE FYB-E400—MiniFibers, Inc.
3. 80% Fraser Paper Stock/20% SWP Fybrel® PE FYB-E400—MiniFibers, Inc.
4. 90% Fraser Paper Stock/10% PET Dry—MiniFibers, Inc.
5. 80% Fraser Paper Stock/20% PET Dry—MiniFibers, Inc.
6. 95% Fraser Paper Stock/5% JM Micro-Strand™ 90-475 glass microfibers
7. 90% Fraser Paper Stock/10% JM Micro-Strand™ 90-475 glass microfibers
8. 95% Fraser Paper Stock/5% JM Micro-Strand™ 100-475 glass microfibers
9. 90% Fraser Paper Stock/10% JM Micro-Strand™ 100-475 glass microfibers
10. 95% Fraser Paper Stock/5% JM Micro-Strand™ 106-475 glass microfibers
11. 90% Fraser Paper Stock/10% JM Micro-Strand™ 106-475 glass microfibers
12. 90% Fraser Paper Stock/5% PET Dry/5% JM Micro-Strand™ 90-475 glass microfibers
13. 90% Fraser Paper Stock/5% PET Dry/5% JM Micro-Strand™ 100-475 glass microfibers
14. 90% Fraser Paper Stock/5% PET Dry/5% JM Micro-Strand™ 106-475 glass microfibers
15. 90% Fraser Paper Stock/5% SWP Fybrel® PE FYB-E400/5% JM Micro-Strand™ 100-475 glass microfibers The jacketed tubular pipe insulation assembly 40 of FIG. 2 includes a tubular piece of pipe insulation 42 and a jacket 44. While the tubular piece of pipe insulation 42 may be made of other insulating materials, preferably, the tubular piece of pipe insulation 42 is made of glass fibers that are bonded together with a thermosetting resin. The jacket 44 is made of a sheet of the facing material 20 of the subject invention.

The tubular piece of pipe insulation 42 has a longitudinally extending slit 46 that passes completely through the tubular wall of the pipe insulation on one side and into the interior of and part of the way through the tubular wall of the pipe insulation on the opposite side of the pipe insulation so that the pipe insulation 42 and thus the jacketed tubular pipe insulation assembly 40 can be opened, passed over, and closed about a pipe. The jacket 44 of the jacketed pipe insulation assembly 40 is wrapped circumferentially about the tubular piece of pipe insulation 42 so that the longitudinal edge portion 48 of the jacket 44 and the sealing tab 50 of the jacket extend adjacent, parallel to, and on opposite sides of the slit 46, but do not overlap the slit 46. The sealing tab typically has a pressure sensitive adhesive layer 52 thereon that is overlaid and protected from degradation before sealing by a removable silicone treated release sheet 54. Once the jacketed tubular pipe insulation assembly 40 is placed on a length of pipe, the release sheet 54 is removed from the adhesive layer 52 and the sealing tab 50 is placed over the slit 46 and adhesively sealed to the longitudinal edge portion 48 of the jacket 44 by the adhesive layer 52 to seal the jacketed pipe insulation assembly 40 about the pipe.

These jacketed tubular pipe insulation assemblies 40 are commonly installed on the pipes of hot and cold piping systems to retard the flow of heat between the pipes of the systems and the ambient environment and conserve energy. The jackets 44 of the jacketed tubular pipe insulation assemblies 40 enhance the performance of the pipe insulation (e.g. retard the transmission of water vapor); prevent the pipe insulation from being exposed to contaminants; make the pipe insulation more aesthetically pleasing; protect the pipe insulation from adverse climatic conditions; and serve as a means for securing and sealing the jacketed tubular pipe insulation assemblies 40 in place on the pipes of the piping systems. The tubular pieces of pipe insulation 42 and hence the jacketed tubular pipe insulation assemblies 40 typically: range in length from about 36 inches (about 0.92 m) to about 48 inches (about 1.22 m); have a wall thickness ranging from about 0.5 inches (about 13 mm) to about 3 inches (about 76 mm); and range in outside diameter from about 2 inches (about 50 mm) to about 23 inches (about 600 mm).

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. A faced pipe insulation product comprising:
a tubular core of fibrous insulation having a length and a longitudinal axis; the tubular core having a substantially cylindrical outer surface; the tubular core having a substantially cylindrical inner surface; the tubular core having a wall extending between the cylindrical outer surface and the cylindrical inner surface; the wall of the tubular core having a radially extending thickness; the wall of the tubular core having a first slit extending completely there through; the first slit extending parallel to the longitudinal axis of the tubular core for the length of the tubular core; the tubular core having a second slit in the inner surface of the tubular core; the second slit being substantially opposite the first slit; the second slit extending parallel to the longitudinal axis of the tubular core for the length of the tubular core; and the second slit extending only partially through the wall of the tubular core to form a longitudinally extending hinge in the tubular core that permits the tubular core to be opened and closed to place the tubular core about a pipe; and a facing laminate; the facing laminate being coextensive with and bonded to the substantially cylindrical outer surface of the tubular core and flexible so that the tubular core with the facing can be opened, placed about a pipe, and closed without degrading the facing laminate; the facing laminate consisting of: a foil or metalized polymeric film sheet layer forming an inner layer of the laminates that is bonded directly to the substantially cylindrical outer surface of the tubular core; a kraft paper sheet layer having only cellulose fibers and forming an outer exposed layer of the laminate; a scrim intermediate the foil or metalized polymeric film sheet layer and the kraft paper sheet layer, an adhesive bonding the foil or metalized polymeric film sheet layer, the kraft paper sheet layer and the scrim together; and the kraft paper sheet layer of the laminate having between 0.1% and 10% by dry weight a humectant for inhibiting the absorption of moisture by fibers of the kraft paper sheet layer to thereby provide the kraft paper sheet layer with greater dimensional stability and reduce wrinkling of the kraft paper sheet layer when the laminate is exposed to conditions of high humidity;

wherein the humectant comprises at least one substance selected from the group consisting of glycerin, ethylene glycol, polyethylene glycol, and isopropylene glycol.

2. The faced insulation product according to claim 1, wherein:

the humectant is at least partially contained in a coating on the kraft paper sheet layer.

3. The faced insulation product according to claim 1, wherein:

the humectant is at least partially contained within the adhesive bonding the foil or metalized sheet layer, the scrim, and the kraft paper sheet layer together.

4. The faced insulation product according to claim 1, wherein:

the humectant is at least partially contained in a coating on an outer surface of the kraft paper sheet layer.

5. The faced insulation product according to claim 1, wherein:

the kraft paper sheet layer includes between 0.5% and 25% by dry weight flame retardant.

\* \* \* \* \*